US011836966B2

(12) United States Patent
Hua et al.

(10) Patent No.: US 11,836,966 B2
(45) Date of Patent: Dec. 5, 2023

(54) EFFICIENT ACROSS-CAMERA TARGET RE-IDENTIFICATION METHOD BASED ON SIMILARITY

(71) Applicant: ZHEJIANG LAB, Zhejiang (CN)

(72) Inventors: Wei Hua, Hangzhou (CN); Yechi Ma, Hangzhou (CN); Shun Zhang, Hangzhou (CN)

(73) Assignee: ZHEJIANG LAB, Zhejiang (CN)

( * ) Notice: Subject to any disclaimer, the term of this patent is extended or adjusted under 35 U.S.C. 154(b) by 0 days.

(21) Appl. No.: 17/896,055

(22) Filed: Aug. 25, 2022

(65) Prior Publication Data

US 2023/0122343 A1  Apr. 20, 2023

Related U.S. Application Data

(63) Continuation of application No. PCT/CN2021/134904, filed on Dec. 1, 2021.

(30) Foreign Application Priority Data

Oct. 19, 2021 (CN) .......................... 202111213721.7

(51) Int. Cl.
*G06K 9/00* (2022.01)
*G06V 10/74* (2022.01)
*G06V 10/82* (2022.01)

(52) U.S. Cl.
CPC ............ *G06V 10/761* (2022.01); *G06V 10/82* (2022.01)

(58) Field of Classification Search
None
See application file for complete search history.

(56) References Cited

U.S. PATENT DOCUMENTS

2022/0415051 A1* 12/2022 Sherman ................ G06V 10/82

FOREIGN PATENT DOCUMENTS

| CN | 109522843 A | 3/2019 |
| CN | 109800624 A | 5/2019 |
| CN | 110263697 A | 9/2019 |

(Continued)

OTHER PUBLICATIONS

International Search Report (PCT/CN2021/134904); dated May 26, 2022.
CN First Office Action(202111213721.7); dated Nov. 24, 2021.

*Primary Examiner* — Soo Jin Park
(74) *Attorney, Agent, or Firm* — W&G Law Group

(57) ABSTRACT

An efficient across-camera target re-identification method based on similarity, which obtains a plurality of matching pairs and similarity scores thereof through two groups of targets to be matched; wherein for the matching pairs that are not matched by both parties, only a part of the matching pairs with higher similarity scores are selected each time, and the matching pairs are traversed according to the order of the similarity scores thereof from large to small, and the matching pairs and the similarity scores thereof are output as a matching result; when any target to be matched in a matching pair already appears in the matching result, the target cannot be output as the matching result; unmatched matching pairs are repeated traversed until the matching result reaches the expectation. The method firstly solves the multi-target matching problem based on similarity, and greatly reduces the time complexity and improves the efficiency.

7 Claims, 1 Drawing Sheet

(56) References Cited

FOREIGN PATENT DOCUMENTS

| | | |
|---|---|---|
| CN | 112257669 A | 1/2021 |
| CN | 112560787 A | 3/2021 |
| CN | 113255394 A | 8/2021 |
| CN | 113642685 A | 11/2021 |
| WO | 2017101434 A1 | 6/2017 |

* cited by examiner

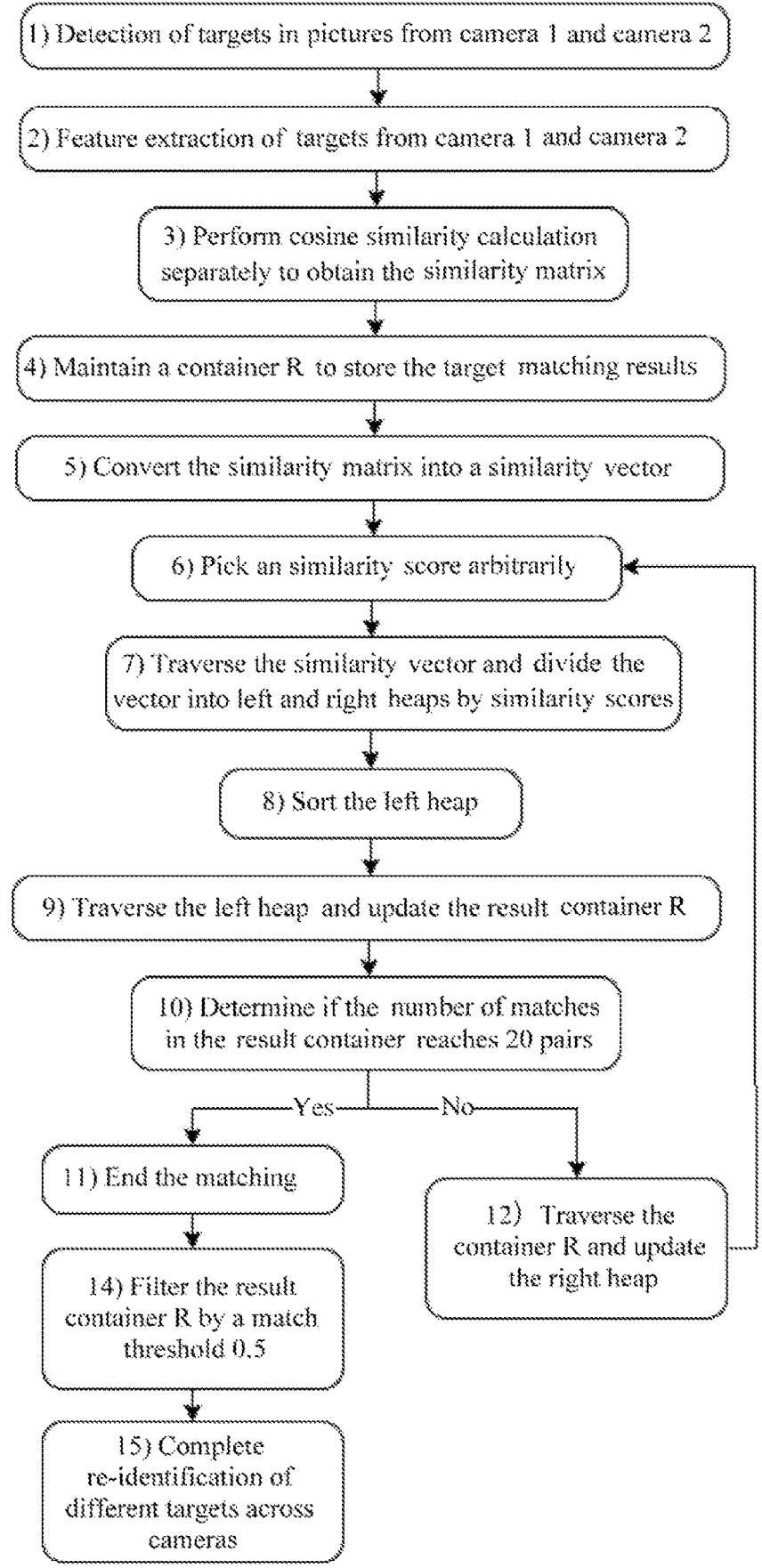

EFFICIENT ACROSS-CAMERA TARGET RE-IDENTIFICATION METHOD BASED ON SIMILARITY

CROSS-REFERENCE TO RELATED APPLICATIONS

The present application is a continuation of International Application No. PCT/CN2021/134904, filed on Dec. 1, 2021, which claims priority to Chinese Application No. 202111213721.7, filed on Oct. 19, 2021, the contents of both of which are incorporated herein by reference in their entireties.

TECHNICAL FIELD

The present application belongs to the technical fields of multi-target tracking, target re-identification and multi-target matching, and in particular relates to an efficient across-camera target re-identification method.

BACKGROUND

With the rapid development of computer vision in the field of artificial intelligence, multi-target tracking with a single camera and target re-identification algorithm across cameras become more and more important in the field of surveillance and unmanned driving. In the overall framework of multi-target tracking and target re-identification, the multi-target matching algorithm is an important link that affects the efficiency of the overall tracking and re-identification algorithm. Improving the efficiency of the multi-target matching algorithm can greatly improve the frame rate of multi-target tracking and the efficiency of target re-identification, and thus has a great impact on the implementation of subsequent algorithms. At present, there are few efficient multi-target matching algorithms related to matching similarity.

SUMMARY

The purpose of the present application is to provide an efficient across-camera target re-identification method based on similarity aiming at the shortcomings of the prior art.

The purpose of the present application is realized through the following technical solution: an efficient across-camera target re-identification method based on similarity, including the following steps:

Taking two pictures by two cameras, and respectively subjecting the two pictures to target detection to obtain two groups of corresponding target detection results, wherein one group of the target detection results comprises A targets to be matched, and the other group of the target detection results comprises B targets to be matched; respectively carrying out feature extraction on the two groups of targets to be matched to obtain a feature vector of each target to be matched; pairing different groups of targets to be matched, and calculating similarity scores according to the feature vector to obtain A*B matching pairs and similarity scores thereof, wherein the similarity scores are between [0,1].

Only taking a part of the matching pairs with higher similarity scores each time for the matching pairs that are not matched by both parties, traversing the matching pairs according to an order of the similarity scores thereof from large to small, and outputting the matching pairs and the similarity scores thereof as a matching result, wherein when any target to be matched in a matching pair already appears in the matching result, the target cannot be output as the matching result.

If a number of the matching pairs in the current matching result does not reach expected K groups, the part with higher similarity scores in the matching pairs that are not matched by both parties is traversed and output again according to the order of the similarity scores from large to small until the matching result reaches the expectation; where $0<K \leq \min(A,B)$.

Further, the target detection results comprise pedestrians.

Further, the method includes the following steps:

1) Converting a two-dimensional matrix of the similarity scores of A*B into a one-dimensional vector M, wherein the length of M is A*B, and recording the row and column values of each similarity score which in the original two-dimensional matrix, corresponding to index numbers in a target to be matched of A and B.

2) Maintaining a result container R to store a selected matching pairs $[i,j,N_{ij}]$, where $N_{ij}$ is the similarity score, i is the index number of the score $N_{ij}$ in A, and j is the index number of the score $N_{ij}$ in B.

3) Randomly selecting a similarity score N from the vector M.

4) Traversing the similarity scores of the vector M, placing the score greater than N in a left heap H_left, and placing the score less than N in a right heap H_right; wherein the similarity score N is placed in the left heap or the right heap.

5) Sorting the left heap H_left to obtain H_left_sorted.

6) Traversing the heap H_left_sorted in the order from large to small; if i or j of a current index is not in the result container R, obtaining a matching pair $[i,j,N_{ij}]$ and adding it into the result container R; if i or j of the current index is in the result container R, skipping a current similarity score and continuing traversing.

7) If the number of the matching pairs in the result container R is greater than or equal to K, ending matching to obtain the result container R.

8) If the number of the matching pairs in the result container R is less than K, traversing the result container R, filtering the similarity scores with the same i or the same j in the right heap H_right according to the index in R, and updating the right heap H_right.

Taking the filtered right heap H_right as a new vector M, and re-executing steps 3) to 8) until the number of the matching pairs of the result container R is greater than or equal to K, and then outputting the result container R.

Further, setting a threshold value for the similarity scores of the matching result, and eliminating the matching pairs below the threshold value in the matching result.

Further, a CenterNet target detection algorithm is used for target detection.

Further, the feature vector of the target to be matched is obtained through feature extraction by a classifier.

Further, the classifier is a ResNet50 neural network.

Further, a cosine similarity of feature vectors of two targets to be matched is used as the similarity score.

The multi-target matching method has the beneficial effects that the time complexity of the multi-target matching algorithm can be greatly reduced while the multi-target matching accuracy is ensured, so that the efficiency of the multi-target matching algorithm is improved, namely, the frame rate of multi-target tracking and the efficiency of target re-identification can be greatly improved, which has a great impact on the implementation of subsequent algorithms.

BRIEF DESCRIPTION OF DRAWINGS

FIG. 1 is a flowchart of the across-camera target re-identification method of the present application.

DESCRIPTION OF EMBODIMENTS

The present application relates to an efficient across-camera target re-identification method based on similarity, which includes the following steps.

Two pictures, namely Data_1 and Data_2, captured by two cameras are input respectively.

A target detection network is trained to perform target detection on the data of Data_1 and Data_2 respectively, so as to obtain the target detection results, Detect_1 and Detect_2, of Data_1 and Data_2.

Target boxes of the input data Data_1 and Data_2 are selected through Detect_1 and Detect_2, respectively to obtain different target data Target_1_i and Target_2_j of Data_1 and Data_2, where $0<i<A$, $0<j<B$, A and B are the numbers of target detections of Data_1 and Data_2, respectively.

A classifier is trained to extract the features of Target_1_i and Target_2_j respectively to obtain the feature vectors F_1_i and F_2_j of different targets in Group A and Group B.

The cosine similarity of the feature vectors F_1_i and F_2_j are calculated respectively to obtain A*B matching pairs of two groups of targets to be matched and the similarity scores thereof, wherein the similarity scores are between [0,1].

Only a part of the matching pairs with higher similarity scores are taken each time for the matching pairs that are not matched by both parties, the matching pairs are traversed according to an order of the similarity scores thereof from large to small, and the matching pairs and the similarity scores thereof are output as a matching result, wherein when any target to be matched in a matching pair already appears in the matching result, the target cannot be output as the matching result.

If the number of the matching pairs in the current matching result does not reach expected K groups, the part with higher similarity scores in the matching pairs that are not matched by both parties is traversed and output again according to the order of the similarity scores from large to small until the matching result reaches the expectation; where $0<K\leq min(A,B)$.

According to the multi-target matching result, the present application completes the matching of different targets of Target_1_i and Target_2_j, and completes the tracking of different targets under different acquisition devices.

In order to make the purpose, technical solution and technical effect of the present application more clear, the present application will be further described in detail below with reference to the drawings and embodiments of the specification.

With respect to video multi-target tracking and target re-identification across cameras, the present application can efficiently complete multi-target matching of different video frames and multi-target matching between different cameras.

In an embodiments, as shown in FIG. 1, for the target re-identification task for the picture data captured across cameras:

1) 20 pedestrian targets are detected in the picture taken by a camera 1 through a CenterNet target detection algorithm, and 30 pedestrian targets are detected in the picture taken by a camera 2 through the CenterNet target detection algorithm.

2) A ResNet50 neural network is used to extract the features from 20 targets of the camera 1 and 30 targets of the camera 2 to obtain the feature vectors of different targets respectively.

3) The cosine similarities of the feature vectors of 20 targets and the feature vectors of 30 targets are calculated respectively to obtain a similarity matrix of 20*30, which respectively represents the similarity scores between different targets of two cameras.

4) A result container R that stores the target matching results is maintained. For example, it can be used to store matching pairs [2, 3, 0.8] that have been matched, where "0.8" is the similarity score; "2" is the second target of camera 1, which is also the number of rows of "0.8" in the similarity matrix; "3" is the third target of camera 2, which is also the number of columns of "0.8" in the similarity matrix.

5) The 20*30 similarity matrix obtained in step 3) is converted into a 1*600 similarity vector, and the row and column positions of each similarity score in the original similarity matrix are recorded.

6) A similarity score N is randomly selected from the 1*600 similarity vector.

7) The rest of the similarity scores in the 1*600 similarity vector is traversed. If the similarity score is greater than or equal to N, this similarity score and the corresponding index for the row and column positions are placed in the left heap H_left; if the score is less than N, the score and the corresponding index for the row and column positions are placed in the right heap H_right.

8) The scores of the left heap H_left are sorted from large to small, and the left heap H_left is updated to obtain a heap H_left_sorted.

9) The left heap H_left_sorted is traversed according to the order of similarity scores from large to small; if the original index for the row or column position of the currently traversed similarity score does not appear in the result container R, a current matching pair, e.g. [2,5,0.7], is obtained and added into the result container R; if the original index for the row or column position of the currently traversed similarity score has appeared in the result container, the current similarity score is skipped to continue to traverse the left heap H_left_sorted.

10) Whether the number of the matching pairs in the result container R reaches 20 pairs is judged.

11) If the number of the matching pairs in the result container R is greater than or equal to 20 pairs, the matching is ended and skip to step 14).

12) If the number of the matching pairs in the result container R is less than 20 pairs, the result container R is traversed, the similarity score with the same index of the row or column value in the right heap H_right is filtered according to the index of the row and column values of the existing matching pairs in R, and the right heap H_right is updated. Step 13) is executed.

13) Steps 6) to 12) are re-executed; the length 600 of the similarity vector is replaced with the length of the right heap H_right updated in step 12). Specifically, based on the updated right heap H_right in step 12), a similarity vector with a corresponding length is generated, and is divided into a new left heap and a new right heap again, and matching pairs with larger similarity scores are put into the result container R according to steps 6) to 12).

14) A similarity score threshold of 0.5 is set, the matching pairs in the result container R are traversed. If the similarity score is less than the matching threshold of 0.5, this matching pair is deleted and the result container R is updated.

15) The re-identification of different targets across cameras is completed through the result container R. Specifically, at this time, the matching pair in the result container R is the target re-identification result.

The method can greatly reduce the time complexity of the multi-target matching algorithm while ensuring the multi-target matching accuracy, wherein the time complexity is as follows:

$$O(n_1 * \log n_1 + n_2' * \log n_2' + \ldots + n_i' \log n_i' + \ldots n_j' \log n_j') \Leftarrow O((r*c)\log(r*c))$$

where r and c are the numbers of two groups of targets to be matched respectively, and k≤min(r,c) is number of matching pairs. $n_1$ and $n_j$ are the numbers of similarity scores of the left heap after the i and j times of heap division, respectively, and $n_i'$ is the number of similarity scores of the filtered $n_i$, $n_i' \leq n_i$, $n_j' \leq n_j$, $1 < i < j$. $n_1 + n_2 + \ldots n_i + \ldots + n_j = r*c$, $n_1' + n_2' + \ldots n_i' + \ldots + n_j' = k$.

In an embodiment, with respect to the 20*30 matching matrix of the embodiment of the present application, the greedy algorithm of the prior art is adopted for target matching, which takes about 26 ms on average, while the present application takes about 6 ms on average.

What is claimed is:

1. An efficient across-camera target re-identification method based on similarity, comprising the following steps:
taking two pictures by two cameras, and subjecting the two pictures to target detection respectively to obtain two groups of corresponding target detection results, wherein one group of the target detection results comprises A targets to be matched, and the other group of the target detection results comprises B targets to be matched; carrying out feature extraction on the two groups of targets to be matched respectively to obtain a feature vector of each target to be matched; pairing different groups of targets to be matched, and calculating similarity scores according to the feature vector to obtain A*B matching pairs and similarity scores thereof, wherein the similarity scores are between [0,1];
taking only a part of the matching pairs with higher similarity scores each time for matching pairs that are not matched by both groups, traversing the part with higher similarity scores in the matching pairs that are not matched by both groups according to an order of the similarity scores thereof from large to small, and outputting the matching pairs traversed and the similarity scores thereof as a matching result, wherein when any target to be matched in a matching pair already appears in the matching result, the target will not be output as the matching result;
wherein when a number of the matching pairs in current matching result does not reach expected K groups, the part with higher similarity scores in the matching pairs that are not matched by both groups is traversed and output again according to the order of the similarity scores from large to small until the matching result reaches an expectation; where 0<K≤min(A,B);

wherein the method comprises the following steps:
1) converting a two-dimensional matrix of the similarity scores of A*B into a one-dimensional vector M, wherein a length of M is A*B, and recording the row and column values of each similarity score which in the original two-dimensional matrix, corresponding to index numbers in a target to be matched of A and B;
2) maintaining a result container R to store a selected matching pairs [i,j,$N_{ij}$], where $N_{ij}$ is the similarity score, i is the index number of the score $N_{ij}$ A, and j is the index number of the score $N_{ij}$ in B;
3). randomly selecting a similarity score N from the vector M;
4). traversing the similarity scores of the vector M, placing the score greater than N in a left heap H_left, and placing the score less than N in a right heap H_right; wherein the similarity score N is placed in the left heap or the right heap;
5). sorting the left heap H_left to obtain H_left sorted;
6). traversing the heap H_left_sorted in the order from large to small; if i or j of a current index is not in the result container R, obtaining a matching pair [i,j,$N_{ij}$] and adding the matching pair [i,j,$N_{ij}$] into the result container R; if i or j of the current index is in the result container R, skipping a current similarity score and continuing traversing;
7). if the number of the matching pairs in the result container R is greater than or equal to K, ending matching to obtain the result container R;
8). if the number of the matching pairs in the result container R is less than K, traversing the result container R, filtering the similarity scores with the same i or the same j in the right heap H_right according to the index in R, and updating the right heap H_right;
taking the filtered right heap H_right as a new vector M, and re-executing steps 3) to 8) until the number of the matching pairs of the result container R is greater than or equal to K, and then outputting the result container R.

2. The efficient across-camera target re-identification method based on similarity according to claim 1, wherein the target detection results comprise pedestrians.

3. The efficient across-camera target re-identification method based on similarity according to claim 1, wherein setting a threshold value for the similarity scores of the matching result, and eliminating the matching pairs below the threshold value in the matching result.

4. The efficient across-camera target re-identification method based on similarity according to claim 1, wherein a CenterNet target detection algorithm is used for target detection.

5. The efficient across-camera target re-identification method based on similarity according to claim 1, wherein the feature vector of the target to be matched is obtained through feature extraction by a classifier.

6. The efficient across-camera target re-identification method based on similarity according to claim 5, wherein the classifier is a ResNet50 neural network.

7. The efficient across-camera target re-identification method based on similarity according to claim 1, wherein a cosine similarity of feature vectors of two targets to be matched is used as the similarity score.

* * * * *